(12) United States Patent
Nabeshima et al.

(10) Patent No.: US 9,815,232 B2
(45) Date of Patent: Nov. 14, 2017

(54) MOLDED FOAM MEMBER MANUFACTURING METHOD, AND SHOCK ABSORBING MEMBER

(71) Applicants: BRIDGESTONE CORPORATION, Tokyo (JP); TOYOTA BOSHOKU KABUSHIKI KAISHA, Kariya-shi, Aichi (JP)

(72) Inventors: Yoichi Nabeshima, Tokyo (JP); Masatoshi Sato, Tokyo (JP); Yoshiyuki Takahashi, Tokyo (JP); Mariko Wada, Nagoya (JP); Akihiro Kawashima, Chiryu (JP); Yasuomi Tanaoka, Chiryu (JP)

(73) Assignee: TOYOTA BOSHOKU KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/908,295

(22) PCT Filed: Jul. 25, 2014

(86) PCT No.: PCT/JP2014/069760
§ 371 (c)(1),
(2) Date: Jan. 28, 2016

(87) PCT Pub. No.: WO2015/016158
PCT Pub. Date: Feb. 5, 2015

(65) Prior Publication Data
US 2016/0158979 A1    Jun. 9, 2016

(30) Foreign Application Priority Data
Jul. 31, 2013   (JP) ................................ 2013-159810

(51) Int. Cl.
*B29C 44/02*    (2006.01)
*F16F 7/12*     (2006.01)
(Continued)

(52) U.S. Cl.
CPC ........ *B29C 44/022* (2013.01); *B29C 44/1271* (2013.01); *B29C 44/1285* (2013.01);
(Continued)

(58) Field of Classification Search
CPC .... F16F 7/12; F16F 7/121; F16F 7/124; F16F 9/30; F16F 9/306; B29C 44/02;
(Continued)

(56) References Cited

U.S. PATENT DOCUMENTS 3,161,436 A * 12/1964 Hood .................... A47C 27/146
                                                        264/229
3,264,382 A *  8/1966 Angell ................. B29C 44/0461
                                                         156/79
(Continued)

FOREIGN PATENT DOCUMENTS

EP    1535795 A    6/2005
JP    8-244047 A   9/1996
(Continued)

OTHER PUBLICATIONS

International Search Report for PCT/JP2014/069760 dated Oct. 28, 2014.

*Primary Examiner* — Thomas J Williams
(74) *Attorney, Agent, or Firm* — Sughrue Mion, PLLC

(57) ABSTRACT

A molded foam member manufacturing method including: a first process of placing a foam molded first portion (11) (first molded body) and a rigid member (3) (rigid plate) in a second portion forming mold (20) (forming mold); and a second process of pouring a second portion-forming synthetic resin raw material (U) (foamable material) into the second portion forming mold (20) (forming mold) and foam molding a second portion (12) (second molded body) so as (Continued)

to surround a portion of the rigid member (3) (rigid plate) and form an integral unit with the first portion (11) (first molded body).

13 Claims, 5 Drawing Sheets

(51) Int. Cl.
  *B29C 44/12* (2006.01)
  *B60R 21/04* (2006.01)
  *B29L 31/30* (2006.01)
  *B29L 31/58* (2006.01)

(52) U.S. Cl.
  CPC ............... B60R 21/04 (2013.01); F16F 7/12 (2013.01); *B29L 2031/30* (2013.01); *B29L 2031/3002* (2013.01); *B29L 2031/3044* (2013.01); *B29L 2031/58* (2013.01)

(58) Field of Classification Search
  CPC ... B29C 44/023; B29C 44/025; B29C 44/027; B29C 44/04; B29C 44/08; B29C 44/083; B29C 44/086; B29C 44/1271; B29C 44/1285; B29C 44/1214
  USPC ......................................... 188/371, 372, 377
  See application file for complete search history.

(56) References Cited

U.S. PATENT DOCUMENTS

| | | | | |
|---|---|---|---|---|
| 3,831,922 | A * | 8/1974 | Appleton | ................. F16F 3/12 267/140 |
| 3,929,948 | A * | 12/1975 | Welch | ................. B29C 44/0461 264/45.5 |
| 5,017,115 | A | 5/1991 | Yanagishita et al. | |
| 2004/0140691 | A1 | 7/2004 | Horimatsu | |
| 2014/0151171 | A1 | 6/2014 | Sato et al. | |
| 2016/0167263 | A1* | 6/2016 | Nabeshima | ......... B29C 44/1271 428/159 |

FOREIGN PATENT DOCUMENTS

| | | | |
|---|---|---|---|
| JP | 09-070836 A | 3/1997 | |
| JP | 9-207696 A | 8/1997 | |
| JP | 2006-142743 A | 6/2006 | |
| JP | 2007-22146 A | 2/2007 | |
| JP | 2009-297285 A | 12/2009 | |
| JP | 2010-017392 A | 1/2010 | |
| JP | 2010-52267 A | 3/2010 | |
| JP | 2011-121485 A | 6/2011 | |
| JP | 2012-236285 A | 12/2012 | |
| JP | 2013-40625 A | 2/2013 | |
| JP | 2014-140975 A | 8/2014 | |
| JP | EP 3028831 A1 * | 6/2016 | ......... B29C 44/1271 |
| WO | 03/037625 A1 | 5/2003 | |

* cited by examiner

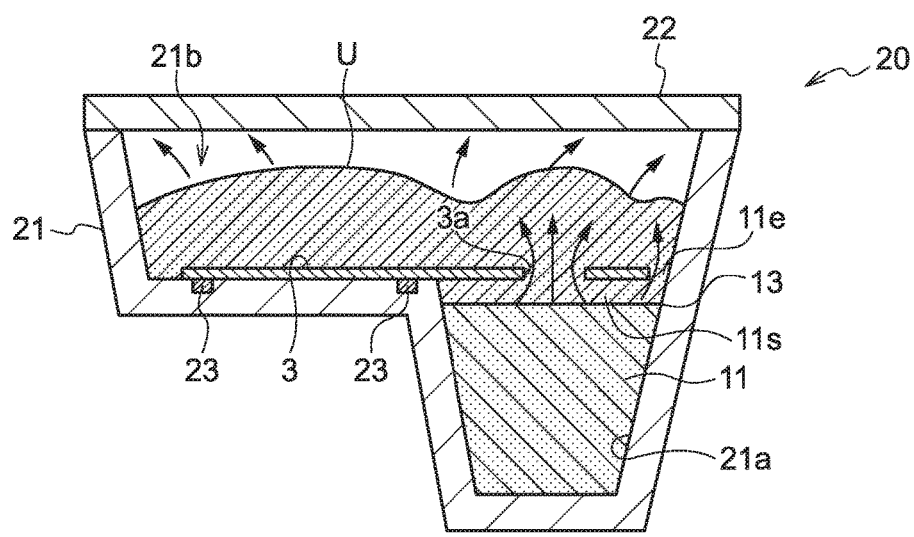
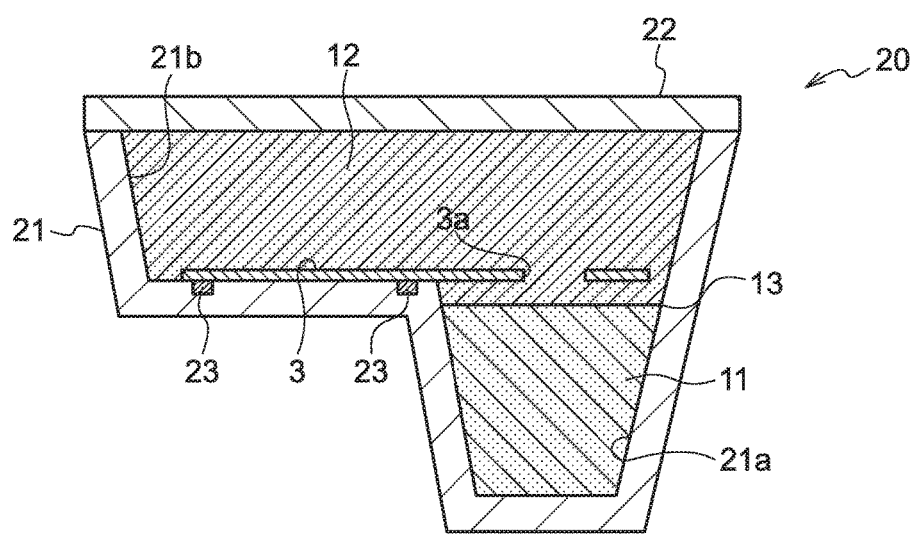

MOLDED FOAM MEMBER MANUFACTURING METHOD, AND SHOCK ABSORBING MEMBER

CROSS REFERENCE TO RELATED APPLICATIONS

This application is a National Stage of International Application No. PCT/JP2014/069760 filed Jul. 25, 2014, claiming priority based on Japanese Patent Application No. 2013-159810 filed Jul. 31, 2013, the contents of all of which are incorporated herein by reference in their entirety.

TECHNICAL FIELD

The present invention relates to a manufacturing method for a molded foam member and a shock absorbing member.

BACKGROUND ART

Shock absorbing members formed from molded foam members such as hard polyurethane foams are attached to automobile doors in order to absorb impact energy in the event of a side-on collision.

Structures have been proposed for improving shock absorption performance by providing a rigid member with higher rigidity than a molded foam member at an impact receiving face of the molded foam member. For example, shock absorbing members exist that have a structure in which a molded foam member is affixed to one face of a rigid member such as an iron plate.

Japanese Patent Application Laid-Open (JP-A) No. 2011-121485 describes a configuration in which a molded foam member is formed at both faces of an iron plate in a structure in which the iron plate is provided with through holes, through which foam moldable resin flows.

In such a configuration, increasing the opening surface area of the through holes provided to the iron plate, or increasing the number of the through holes, may be considered as a way of improving the flow characteristics of a foamable synthetic resin inside the mold cavity during manufacture. However, this would reduce the rigidity and strength of the iron plate, leading to concerns of a reduction in the shock absorption performance of the shock absorbing member.

Alternatively, a manufacturing method may be considered in which the molded foam members to be disposed at the front side and back side of the iron plate are formed separately, and the molded foam members are then stacked with the iron plate, and integrated together using an adhesive or the like. However, in such cases, there are concerns of positional displacement arising between respective portions of the molded foam members, and between respective portions of the molded foam members and the iron plate, as well as concerns of a reduction or variability in the joint strength to the molded foam members, when stacking and integrating together the respective portions of the separately formed molded foam members and the iron plate.

SUMMARY OF INVENTION

Technical Problem

In consideration of the above circumstances, an object of the present invention is to mold a molded foam member with good precision at both faces of a rigid plate.

Solution to Problem

A molded foam member manufacturing method according to a first aspect of the present invention includes: a first process of placing a foam molded first molded body and a rigid plate in a forming mold; and a second process of pouring a foamable material into the forming mold and foam molding a second molded body so as to surround one or more portions of the rigid plate and form an integral unit with the first molded body.

In this molded foam member manufacturing method, the foam molded first molded body and the rigid plate are placed in the forming mold, and the foamable material is poured in to foam mold the second molded body by two-stage foam molding, thereby rendering a process to affix the first molded body and the second molded body to the rigid plate unnecessary. Moreover, it is possible to suppress relative positional displacement, this being an error in attachment, between the first molded body, the second molded body, and the rigid plate in a state placed in the forming mold.

In a molded foam member manufacturing method according to a second aspect, in the first process, the placement in the forming mold is performed so as to provide a space between the first molded body and the rigid plate; and in the second process, the foamable material is made to enter the space and further to surrounding the one portion of the rigid plate with the second molded body, joins the first molded body with the second molded body.

This molded foam member manufacturing method enables the rigid plate to be surrounded by the second molded body, and joined to the first molded body.

In a molded foam member manufacturing method according to a third aspect, in the first process, the rigid plate is placed so as to create a gap between an inner wall of the forming mold and a peripheral edge portion of the rigid plate.

This molded foam member manufacturing method enables the foamable material to flow through the gap to the space between the rigid plate and the first molded body without encountering resistance.

In a molded foam member manufacturing method according to a fourth aspect, in the second process, the rigid plate that is used is formed with a through hole, and the foamable material is made to enter the space through the through hole.

This molded foam member manufacturing method enables the foamable material to flow through the through hole to the space between the rigid plate and the first molded body without encountering resistance.

In a molded foam member manufacturing method according to a fifth aspect, in the first process, the placement is made such that a portion of the rigid plate is pressed against an inner face of the forming mold such that the foamable material does not enter between the portion of the rigid plate and the forming mold.

This molded foam member manufacturing method enables the rigid plate to be formed with an exposed face, where a molded body is not foam molded to the surface.

A shock absorbing member according to a sixth aspect includes: a first molded body that is foam molded to a portion of one face of a rigid plate; and a second molded body that is foam molded to the entirety of another face of the rigid plate.

This shock absorbing member enables impact force to be absorbed in two stages by the first molded body and the second molded body. After the first molded body has absorbed impact and been squashed, force is transmitted to the second molded body through the rigid plate, enabling the impact to be absorbed while maintaining a constant orientation.

In a shock absorbing member according to a seventh aspect, the first molded body and the second molded body are respectively formed from different types of foamable materials.

In this shock absorbing member, one of the molded bodies can be squashed more easily than the other when the first molded body and the second molded body absorb impact force in two stages, thereby enabling the range of absorbable impacts to be increased.

In a shock absorbing member according to an eighth aspect, a through hole is provided at a part of the rigid plate that is disposed between the first molded body and the second molded body.

In this shock absorbing member, the second molded body is integrated together with the first molded body through the through hole of the rigid plate during foam molding, thereby enabling a structure in which displacement between the foam molded members in the planar direction of the rigid plate is discouraged.

In a shock absorbing member according to a ninth aspect, a diameter of the through hole is from 10 mm to 20 mm.

In this shock absorbing member, the diameter of the through hole is from 10 mm to 20 mm, thereby enabling the foamable material to pass through without encountering resistance during foam molding, and enabling the strength of the rigid plate to be maintained.

In a shock absorbing member according to a tenth aspect, from two to ten of the through holes are provided per 10,000 $mm^2$ of a plate face of the rigid plate; and a spacing between adjacent of the through holes is from 10 mm to 70 mm.

This shock absorbing member enables the foamable material to pass through without encountering resistance during foam molding, and enables the strength of the rigid plate to be maintained.

In a shock absorbing member according to an eleventh aspect, in the second molded body, the second molded body is joined to the first molded body and the rigid plate by foamable material that has flowed around to the first molded body side of the rigid plate.

This shock absorbing member enables a structure in which the second molded body is integrally formed together with the first molded body during foam molding.

Advantageous Effects of Invention

Due to the above configuration, the present invention enables a molded foam member to be molded with good precision at both faces of the rigid plate.

BRIEF DESCRIPTION OF DRAWINGS

FIG. 8 is a cross-section illustrating the molded foam member manufacturing method illustrated in FIG. 7, illustrating a process following that of FIG. 7.

FIG. 9 is a cross-section illustrating the molded foam member manufacturing method illustrated in FIG. 7, illustrating a process following that of FIG. 8.

DESCRIPTION OF EMBODIMENTS

Explanation follows regarding the structure of a manufacturing method of a molded foam member according to a first exemplary embodiment of the present invention, with reference to the drawings.

Explanation follows regarding an exemplary embodiment, with reference to the drawings. Note that in the following exemplary embodiment, explanation is given regarding an example in which a shock absorbing member (abbreviated below to "EA member") attached to the inside an automobile door is employed as the molded foam member. However, the present invention is also applicable to other molded foam members and their manufacturing methods.

Figure 1:
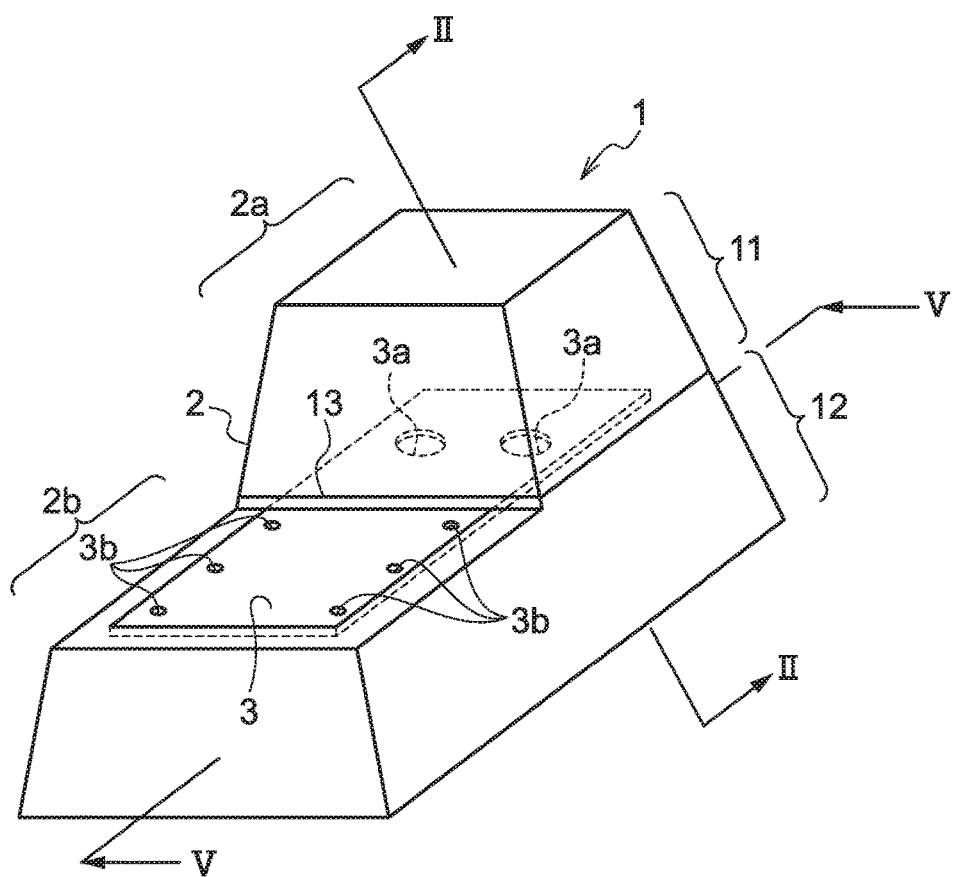
FIG. 1 is a perspective view of a molded foam member according to a first exemplary embodiment.
Figure 2:
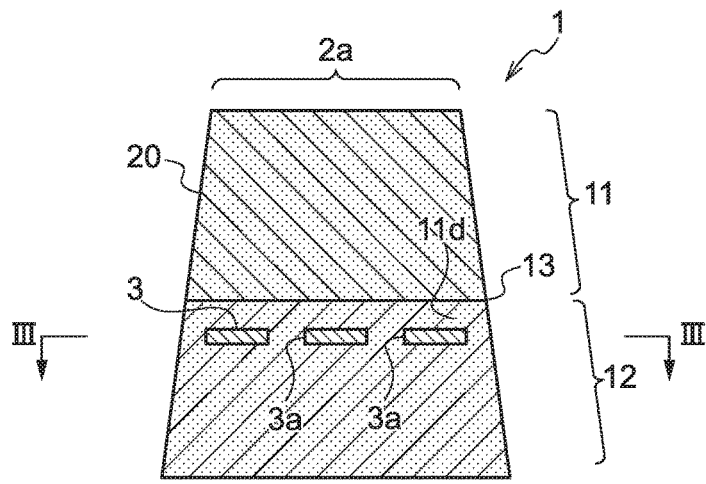
FIG. 2 is a cross-section of the molded foam member illustrated in FIG. 1, as seen from line II-II.
Figure 3:
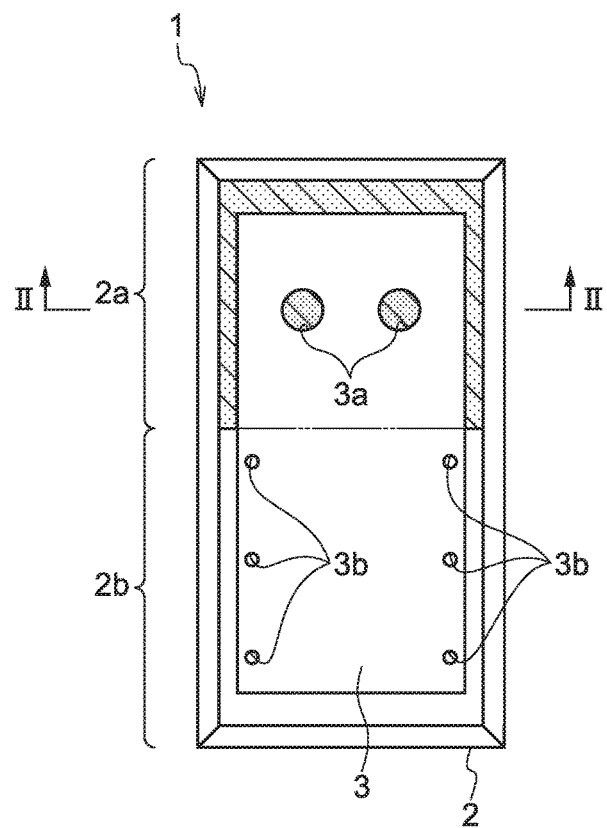
FIG. 3 is a cross-section of a second portion of the molded foam member illustrated in FIG. 1, as seen from line III-III in FIG. 2.
Figure 4:
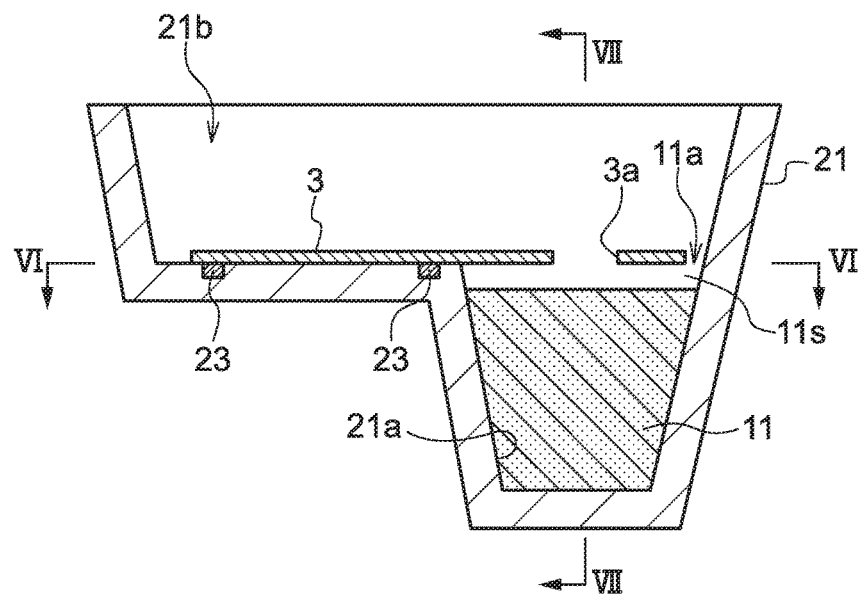
FIG. 4 is a cross-section of a second portion forming mold in manufacture of the molded foam member illustrated in FIG. 1, as seen from line V-V in FIG. 1.
Figure 5:
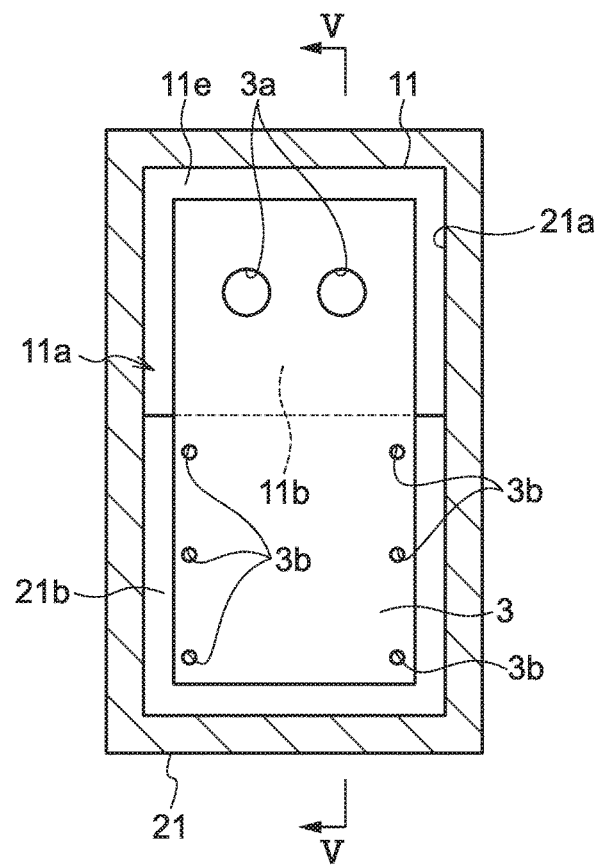
FIG. 5 is a cross-section of a second portion forming mold in manufacture of the molded foam member illustrated in FIG. 1, seen from line II-III in FIG. 2 from the side of a first portion.
Figure 6:
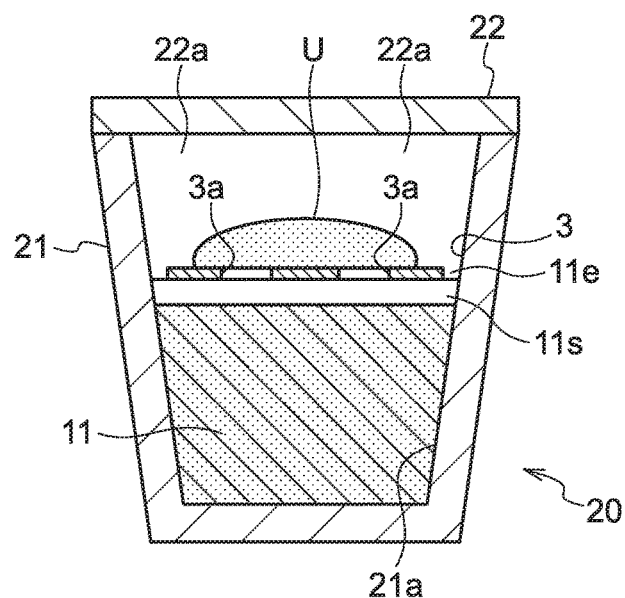
FIG. 6 is a cross-section of a second portion forming mold in manufacture of the molded foam member illustrated in FIG. 1, as seen from line VII-VII in FIG. 4.

FIG. 1 is a perspective view illustrating an EA member 1 (shock absorbing member) serving as a molded foam member according to an exemplary embodiment. FIG. 2 and FIG. 3 are respective cross-sections of the EA member 1. Note that FIG. 2 is a cross-section taken along lines II-II in FIG. 1 and FIG. 3, and FIG. 3 is a cross-section taken along line III-III in FIG. 2. FIG. 4 to FIG. 9 are respective cross-sections of a mold, and illustrate a manufacturing method of the EA member 1 (metal molds are preferable; however, other materials may also be employed). Note that FIG. 4 and FIG. 7 to FIG. 9 respectively illustrate cross-sections of a portion along line V-V in FIG. 5, FIG. 5 illustrates a cross-section of a portion along line VI-VI in FIG. 4, and FIG. 6 illustrates a cross-section of a portion along line VII-VII in FIG. 4.

EA Member 1 Configuration

In the present exemplary embodiment, a lower face of the EA member 1 illustrated in FIG. 1 and FIG. 2 faces a door inner face when the EA member 1 is attached inside the door. For simplicity, in the following explanation, the door inner face side of the EA member 1 (the lower side in FIG. 1 and FIG. 2) is referred to as the base end side, and the opposite side to the door trim (the upper side in FIG. 1 and FIG. 2) is referred to as the leading end side. The direction from the base end side toward the leading end side (or the opposite direction thereto) is referred to as the thickness direction.

The EA member 1 includes an EA member body 2, serving as a molded foam member that is foam molded from a synthetic resin raw material such as a hard polyurethane, and a rigid member 3, serving as an embedded member that is at least partially embedded in the EA member body 2.

In the present exemplary embodiment, the EA member body 2 includes a large thickness portion 2a that has a large thickness (a large size from the base end side to the leading end side), and a small thickness portion 2b that has a smaller thickness than the large thickness portion 2a. As illustrated in FIG. 1, the large thickness portion 2a and the small thickness portion 2b are respectively disposed adjacent to each other in a direction orthogonal to the thickness direction. For simplicity, in the following explanation the direction in which the large thickness portion 2a and the small thickness portion 2b are adjacent to each other is referred to as the length direction of the EA member body 2, and a direction orthogonal to both the length direction and the thickness direction is referred to as the width direction of the EA member body 2. As illustrated in FIG. 1, respective base end side end faces (referred to below as the base end faces) of the large thickness portion 2a and the small thickness portion 2b are contiguous to each other with substantially coplanar profiles, and a leading end side end face of the small thickness portion 2b (referred to below as the leading end face) is at a step back toward the base end side compared to the leading end face of the large thickness portion 2a. Note that the shape of the EA member body 2 is not limited thereto.

As illustrated in FIG. 1 to FIG. 3, in the present exemplary embodiment, a rigid member 3 (rigid plate) is a metal plate member disposed straddling between the large thickness portion 2a and the small thickness portion 2b. One portion of the rigid member 3 is embedded in the large thickness portion 2a, and another portion of the rigid member 3 is embedded in the small thickness portion 2b. The surface of the rigid member 3 is partially exposed.

As illustrated in FIG. 1 to FIG. 3, in the present exemplary embodiment, the rigid member 3 has a flat plate shape, and a plate face thereof is disposed in a direction substantially parallel to leading end faces of both the large thickness portion 2a and the small thickness portion 2b. As illustrated in FIG. 1, in the present exemplary embodiment, a portion of the rigid member 3 is disposed so as to cover across the leading end face of the small thickness portion 2b, and is effectively embedded inside the small thickness portion 2b by its own thickness, such that the plate face (referred to below as the leading end side plate face) of the rigid member 3 is exposed at the leading end face of the small thickness portion 2b. The exposed leading end side plate face of the rigid member 3 and the leading end face of the small thickness portion 2b have substantially coplanar profiles. Note that the placement of the rigid member 3 is not limited thereto, and for example, the rigid member 3 may be embedded in the small thickness portion 2b such that at least a portion of the leading end side plate face is covered by the foamed synthetic resin configuring the small thickness portion 2b.

As illustrated in FIG. 1 to FIG. 3, a portion of the rigid member 3 is embedded in the large thickness portion 2a partway along the thickness direction. In the present exemplary embodiment, the side of the rigid member 3 that is embedded in the large thickness portion 2a is provided with through holes 3a penetrating the rigid member 3 in the thickness direction. During the second portion forming process, described later, second portion-forming synthetic resin raw material U (foamable material) that is fed in further to the base end side (the side of a second portion 12, described later) of the large thickness portion 2a than the rigid member 3 is also fed in to a leading end side (the side of a first portion 11, described later) of the large thickness portion 2a through the through holes 3a. Moreover, second portion-forming synthetic resin raw material U that is fed in further to the leading end side of the large thickness portion 2a than the rigid member 3 and foamed expands as far as the base end side of the large thickness portion 2a through the through holes 3a.

As illustrated in FIG. 1 and FIG. 3, in the present exemplary embodiment, two of the through holes 3a are provided to the portion of the rigid member 3 that is embedded in the large thickness portion 2a, at a spacing in the width direction of the EA member body 2. However, the number and placement of the through holes 3a are not limited thereto. In the present exemplary embodiment, the shape of the openings of the through holes 3a is a circular shape. However, the opening shape of the through holes 3a is not limited thereto. It is desirable for the diameter of each of the through holes 3a, and the number of the through holes 3a per unit surface area, to be kept within the following ranges in order to secure adequate flow characteristics for the second portion-forming synthetic resin raw material U through the through holes 3a around the time of foaming, as well as securing adequate rigidity and strength of the rigid member 3, as described later.

Namely, it is desirable for the diameter of each through hole 3a to be within a range of from 10 mm to 20 mm, and a range of from 12 mm to 15 mm is more preferable. The inventors observed during testing that above this size, the strength of the rigid member 3 is reduced, and below this size, there is a concern of the second portion-forming synthetic resin raw material U not passing through with sufficiently low resistance. Moreover, it is desirable that the number of the through holes 3a provided per 10,000 mm$^2$ of the plate face of the rigid member 3 is from two to ten, and a range of from five to seven is more preferable. Above this number, the strength of the rigid member 3 is reduced, and below this number, there is a concern of the second portion-forming synthetic resin raw material U not passing through with sufficiently low resistance. It is desirable that the spacing between adjacent through holes 3a is within a range of from 10 mm to 70 mm, and a range of from 30 mm to 50 mm is more preferable. Closer together than this, the strength of the rigid member 3 is reduced, and further apart than this, there is a concern of the second portion-forming synthetic resin raw material U not passing through with sufficiently low resistance.

As illustrated in FIG. 1 to FIG. 3, in the present exemplary embodiment, an outer peripheral edge of the rigid member 3 is not exposed, and is embedded within the EA member body 2. Note that the outer peripheral edge may also be exposed rather than embedded.

Namely, in the present exemplary embodiment, during a placement process, described later, when the rigid member 3 is being placed inside the mold 20, serving as an example of a forming mold, configuration is made such that a gap 11e, illustrated in FIG. 5 and FIG. 6, is formed between the outer peripheral edge of the rigid member 3 and a cavity inner face, serving as an example of an inner wall, of the mold 20. Accordingly, in the second portion forming process, around the foaming time, the second portion-forming synthetic resin raw material U is also able to flow through the gap 11e from the base end side to the leading end side of the rigid member 3 in the large thickness portion 2a, or vice-versa. Side peripheral faces of the EA member body 2 are formed from foamed synthetic resin due to the gap 11e also being filled with foamed synthetic resin.

Note that in a state in which the rigid member 3 has been placed in the mold 20, the gap 11e between the outer peripheral edge of the rigid member 3 and the cavity inner face of the mold 20 is in a range of from 5 mm to 50 mm, and in particular, is preferably in a range of from 10 mm to 20 mm.

As illustrated in FIG. 1 and FIG. 3, in the present exemplary embodiment, small holes 3b are provided on the small thickness portion 2b side of the rigid member 3. The small holes 3b are preferably through holes that penetrate the rigid member 3, but may be recesses with non-penetrating shapes. In the second portion forming process, the foamed synthetic resin enters the small holes 3b, thereby improving the join strength between the rigid member 3 and the small thickness portion 2b. The diameter of each of the small holes 3b is from 1 mm to 10 mm, and in particular, is preferably from 2 mm to 5 mm. In the present exemplary embodiment, three of the small holes 3b are provided with circular shapes along edges on the two sides of the rigid member 3; however, the shape, number, and placement of the small holes 3b are not particularly limited.

Examples of materials for configuring the rigid member 3 include sheet metal such as an iron plate or an aluminum plate, or a resin plate. An iron plate is particularly preferably used. The thickness of the rigid member 3 is preferably in a range of from 0.3 mm to 5.0 mm, and is more preferably in a range of from 0.6 mm to 1.6 mm.

The configuration and placement of the rigid member 3 are not limited to the above. For example, in cases in which the rigidity and strength of the rigid member 3 are paramount, configuration may be made in which the rigid member 3 is not provided with the through holes 3a, and instead, for example; a peripheral edge portion may be provided with notches, or a portion of an end face may be pressed against the inner face of the cavity such that the second portion-forming synthetic resin raw material U does not enter between the portion of the end face and the cavity inner face. In the second portion forming process, configuration may be made such that the second portion-forming synthetic resin raw material U is made to flow through the gap 11e between the outer peripheral edge of the rigid member 3 mentioned above and the cavity inner face of the mold 20. Outer peripheral edges of the rigid member 3 may be at least partially exposed at the side peripheral faces of the EA member body 2. A portion of the rigid member 3 may extend out to the outside of the EA member body 2. The rigid member 3 may be configured with a shape other than a flat plate shape.

In the present exemplary embodiment, a portion of the large thickness portion 2a of the EA member body 2 that is further to the leading end side than a thickness direction intermediate portion configures the first portion 11, serving as an example of a first molded body, this being prepared in a first portion preparation process, described later. A portion of the large thickness portion 2a that is further to the base end side than the thickness direction intermediate portion, and the small thickness portion 2h, are formed integrally to one another as the second portion 12, serving as an example of a foam molded second molded body, during the second portion forming process, described later. The first portion 11 and the second portion 12 are adjacent to each other, and during the second portion forming process, the second portion-forming synthetic resin raw material U contacts the first portion 11 so as to form a welded body. In FIG. 1 and FIG. 2, the reference numeral 13 indicates a boundary portion between the first portion 11 and the second portion 12.

In the present exemplary embodiment, as illustrated in FIG. 1 and FIG. 2, the first portion 11 configures a portion of the large thickness portion 2a that is further to the leading end side of the large thickness portion 2a than the rigid member 3 embedded in the large thickness portion 2a. Namely, the rigid member 3 is not embedded in the first portion 11, and is separated by a specific spacing therefrom. This spacing is preferably approximately 0.5 mm to 10 mm, and is 5 mm in the present exemplary embodiment. The rigid member 3 is, as a whole, embedded in the second portion 12 at the vicinity of the boundary between the first portion 11 and the second portion 12. Note that the partitioned structure of the first portion 11 and the second portion 12 is not limited thereto.

In the present exemplary embodiment, when the first portion 11 has been placed in a space corresponding to the first portion inside the cavity of the mold 20 during the placement process, described later, as illustrated in FIG. 4, at least a portion of a boundary face 11a is configured so as to be separated from an opposing face of the rigid member 3 that is placed in a space corresponding to the rigid member inside the cavity.

In the second portion forming process, second portion-forming synthetic resin raw material U that is fed in further to the second portion 12 side than the rigid member 3 flows around to the first portion 11 side of the rigid member 3 through the through holes 3a and the gap 11e between the rigid member 3 and the cavity inner face of the mold 20.

Second Portion Forming Mold 20 Configuration

The internal profile of the cavity of the second portion forming mold 20 has a shape corresponding to the overall external profile of the EA member body 2. As illustrated in FIG. 4 to FIG. 9, in the present exemplary embodiment, the mold 20 includes a lower mold 21 and an upper mold 22. Note that the mold 20 may also include a mold core or the like if required. The lower mold 21 mainly configures a cavity bottom face and side peripheral faces, and the upper mold 22 mainly configures a cavity top face. In the present exemplary embodiment, the EA member body 2 is formed with its leading end side facing downward in the cavity of the mold 20. Namely, the leading end face of the EA member body 2 is formed by the cavity bottom face of the lower mold 21, the side peripheral faces of the EA member body 2 are formed by the cavity side peripheral faces of the lower mold 21, and the base end face of the EA member body 2 is formed by the cavity top face of the upper mold 22. A comparatively deep large depth portion 21a, corresponding to the large thickness portion 2a of the EA member body 2, and a small depth portion 21b that is shallower than the large depth portion 21a, corresponding to the small thickness portion 2b of the EA member body 2, are formed inside the cavity of the lower mold 21.

Inside the cavity of the mold 20, in the large depth portion 21a, a space from partway in the depth direction (a position slightly lower than the bottom face of the small depth portion 21b) to the bottom face configures the space corresponding to the first portion, in which the first portion 11 of the EA member body 2 is placed. A space spanning from the bottom face of the small depth portion 21b to an equivalent depth (above the first portion 11) inside the large depth portion 21a configures the space corresponding to the rigid member 3 embedded in the EA member body 2. The bottom face of the small depth portion 21b may be provided with fasteners 23, such as magnets, to fasten the rigid member 3 disposed at the bottom face. Note that the fasteners 23 are not limited to magnets. The remaining space inside the cavity of the mold 20 configures a space corresponding to the second portion in which the second portion 12 of the EA member body 2 is formed.

EA Member 1 Manufacturing Method

The following first portion preparation process, placement process that serves as an example of a first process, and second portion forming process that serves as an example of a second process, are performed during manufacture of the EA member 1. Note that the first portion-forming synthetic resin raw material configuring the first portion 11 and the second portion-forming synthetic resin raw material configuring the second portion 12 may have the same composition as each other, or may have different compositions to each other.

(1) First Portion Preparation Process

Foam molding of the first portion 11 is performed in advance, separately to the second portion 12. The first portion 11 may be formed using a similar method to one generally used for molding a single molded foam member. Namely, for example, a mold may be preferably employed without any issues arising as long as the mold employed to form the first portion 11 is a mold (not illustrated in the drawings) in which the internal profile of the cavity has a shape corresponding to the external profile of the first portion 11.

(2) Placement Process

Next, as illustrated in FIG. 4 and FIG. 5, the foam molded first portion 11, and the rigid member 3, are placed inside the cavity of the mold 20. When this is performed, a space 11s is provided between the first portion 11 and the rigid member 3. A portion of the rigid member 3 is fastened to a bottom face of the small depth portion 21b by the fasteners 23, such that the second portion-forming synthetic resin raw material U does not enter between this portion of the rigid member 3 and the bottom face of the small depth portion 21b (see FIG. 7 to FIG. 9) The region of the rigid member 3 that is formed with the through holes 3a is in a state jutting out above the first portion 11 in the large depth portion 21a. Accordingly, the space 11s is positioned partway in the depth direction of the large depth portion 21a (at a position slightly lower than the bottom face of the small depth portion 21b).

(3) Second Portion Forming Process

Next, the second portion 12 is foam molded. As illustrated in FIG. 6, the second portion-forming synthetic resin raw material U is fed into the space corresponding to the second portion inside the cavity of the mold 20 (for example above the rigid member 3), and the second portion-forming synthetic resin raw material U is foamed after the upper mold 22 is covered over the lower mold 21 to close the mold.

Figure 7:
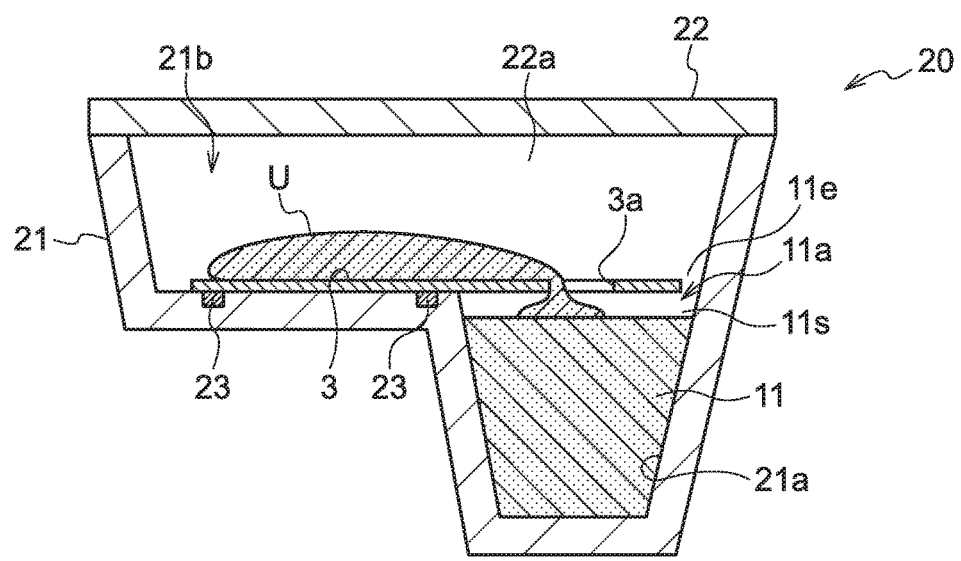
FIG. 7 is a cross-section of a second portion forming mold, illustrating a manufacturing method of the molded foam member illustrated in FIG. 1, as seen from line V-V in FIG. 1.

Since the second portion-forming synthetic resin raw material U has low viscosity immediately after being fed into the space corresponding to the second portion, as illustrated in FIG. 7, some of the second portion-forming synthetic resin raw material U flows over the rigid member 3 and passes through the through holes 3a and the gap 11e between the rigid member 3 and the cavity inner face of the mold 20 to flow around to the lower side of the rigid member 3 (above the boundary face 11a of the first portion 11). Note that when feeding in the second portion-forming synthetic resin raw material U, the second portion-forming synthetic resin raw material U may, for example, be fed in above the boundary face 11a of the first portion 11 directly, through the through holes 3a or the like.

As illustrated in FIG. 8, the second portion-forming synthetic resin raw material U that has been fed in above the boundary face 11a of the first portion 11 is foamed, filling in between the first portion 11 and the rigid member 3. Since the second portion-forming synthetic resin raw material U contacts the boundary face 11a of the first portion 11, the second portion 12 that is formed by foaming the second portion-forming synthetic resin raw material U thermally welds to the first portion 11 to form a single unit. Some of the second portion-forming synthetic resin raw material U foamed at the lower side of the rigid member 3 expands as far as the upper side of the rigid member 3 through the through holes 3a and the gap 11e between the rigid member 3 and the cavity inner face of the mold 20. The remaining second portion-forming synthetic resin raw material U is foamed at the upper side of the rigid member 3, and expands so as to fill the space corresponding to the second portion, together with the second portion-forming synthetic resin raw material U from the lower side of the rigid member 3.

As illustrated in FIG. 9, filling the space corresponding to the second portion with the foamed synthetic resin formed by foaming the second portion-forming synthetic resin raw material U forms the second portion 12 and completes molding of the overall EA member body 2, as well as embedding the rigid member 3 inside the second portion 12 so as to integrate the rigid member 3 together with the second portion 12.

After the foamed synthetic resin has cured, the lower mold 21 and the upper mold 22 are opened and the EA member body 2 is demolded. The surface of the EA member body 2 is then finished as necessary to complete the EA member 1.

Note that configuration may be made in which the first portion 11 is mass-produced in advance, and only the second portion forming process is performed on the actual EA member production line, or configuration may be made in which the first portion preparation process and the second portion forming process are performed in sequence in a single production cycle of the EA member.

Explanation has been given above regarding an exemplary embodiment as an embodiment for implementing the present invention. However, this exemplary embodiment is merely an example, and various modifications may be implemented within a range not departing from the spirit of the present invention. For example, in the exemplary embodiment described above, the rigid member 3 serving as an embedded member is partially exposed at an external face of the EA member body 2 serving as a molded foam member. However, the rigid member 3 may be provided so as to be completely embedded within the EA member body 2, or an entire face of the rigid member 3 may be exposed. The shape of the EA member body 2 may also be set freely.

The disclosure of Japanese Patent Application No. 2013-159810, filed on Jul. 31, 2013, is incorporated in its entirety by reference herein.

All cited documents, patent applications and technical standards mentioned in the present specification are incorporated by reference in the present specification to the same extent as if the individual cited document, patent application, or technical standard was specifically and individually indicated to be incorporated by reference.

EXPLANATION OF THE REFERENCE NUMERALS

1 EA member
2 EA member body (shock absorbing member)
3 rigid member (rigid plate)
3a through holes
11 first portion (first molded body)
11a boundary face
11e gap
11s space
12 second portion (second molded body)
20 mold (forming mold)
U Second portion-forming synthetic resin raw material (foamable material)

The invention claimed is:
1. A molded foam member manufacturing method, comprising:

a first process of placing a foam molded first molded body and a rigid plate in a forming mold; and a second process of pouring a foamable material into the forming mold and foam molding a second molded body so as to surround one or more portions of the rigid plate and form an integral unit with the first molded body, wherein the first process is performed entirely before the second process of pouring the foamable material is performed, and wherein the foamable material is molded to an entirety of a first side of the rigid plate, which is opposite a side of the rigid plate on which the first molded body is provided.

2. The molded foam member manufacturing method of claim 1, wherein:

in the first process, the placement in the forming mold is performed so as to provide a space between the first molded body and the rigid plate; and in the second process, the foamable material is made to enter the space and, further to surrounding the one portion of the rigid plate with the second molded body, joins the first molded body with the second molded body.

3. The molded foam member manufacturing method of claim 2, wherein, in the first process, the rigid plate is placed so as to create a gap between an inner wall of the forming mold and a peripheral edge portion of the rigid plate.

4. The molded foam member manufacturing method of claim 2, wherein, in the second process, the rigid plate that is used is formed with a through hole, and the foamable material is made to enter the space through the through hole.

5. The molded foam member manufacturing method of claim 1, wherein, in the first process, the placement is made such that a portion of the rigid plate is pressed against an inner face of the forming mold such that the foamable material does not enter between the portion of the rigid plate and the forming mold.

6. The molded foam member manufacturing method of claim 1, wherein at least a portion of a face of a second side of the rigid plate, opposite the first side, is free of the foamable material.

7. A shock absorbing member, comprising:

a first molded body that is foam molded directly to a second foam molded body on a first side of a rigid plate; and the second molded body is foam molded to the entirety of a face of a second side of the rigid plate, opposite the first side, and foam molded to a portion of a face of the first side of the rigid plate, wherein a through hole is provided at a part of the rigid plate and the second molded body is disposed in the through hole.

8. The shock absorbing member of claim 7, wherein the first molded body and the second molded body are respectively formed from different types of foamable material.

9. The shock absorbing member of claim 7, wherein a diameter of the through hole is from 10 mm to 20 mm.

10. The shock absorbing member of claim 7, wherein:

from two to ten of the through holes are provided per 10,000 $mm^2$ of a plate face of the rigid plate; and a spacing between adjacent of the through holes is form 10 mm to 70 mm.

11. The shock absorbing member of claim 7, wherein, in the second molded body, the second molded body is joined to the first molded body by foamable material that has flowed around to the first molded body side of the rigid plate.

12. The shock absorbing member of claim 7, wherein at least a portion of the face of the first side of the rigid plate is exposed from the shock absorbing member.

13. The shock absorbing member of claim 7, wherein at least a portion of the face of the first side of the rigid plate is free of the foamable material.

* * * * *